United States Patent
Bookbinder et al.

(10) Patent No.: US 7,680,381 B1
(45) Date of Patent: Mar. 16, 2010

(54) BEND INSENSITIVE OPTICAL FIBERS

(75) Inventors: Dana Craig Bookbinder, Corning, NY (US); Ming-Jun Li, Horseheads, NY (US); Ji Wang, Painted Post, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 12/278,000

(22) Filed: Nov. 25, 2008

(51) Int. Cl.
*G02B 6/036* (2006.01)
(52) U.S. Cl. ............................. 385/127; 385/126
(58) Field of Classification Search .................. 385/127
See application file for complete search history.

(56) References Cited

U.S. PATENT DOCUMENTS

2006/0233503 A1* 10/2006 Kumano ................. 385/126
2009/0060436 A1* 3/2009 Bickham et al. ........... 385/124
2009/0148113 A1* 6/2009 Bickham et al. ........... 385/127
2009/0263091 A1* 10/2009 Kumano ................. 385/127

* cited by examiner

*Primary Examiner*—Sung H Pak
(74) *Attorney, Agent, or Firm*—Robert L. Carlson

(57) ABSTRACT

An optical fiber includes a core, an inner cladding and a low index ring of silica-based glass. The core comprises silica-based glass, an index of refraction $n_1$, and a relative refractive index percent $\Delta_1\%$ relative to pure silica glass. The inner cladding surrounds the core and comprises an index of refraction $n_2$ and a relative refractive index percent $\Delta_2\%$ relative to pure silica glass, wherein $\Delta_1\% > \Delta_2\%$ and the difference between $\Delta_1\%$ and $\Delta_2\%$ is greater than about 0.1%. The low index ring surrounds the inner cladding and comprises silica glass co-doped with boron and fluorine, a radial thickness of less than about 20 μm, an index of refraction $n_3$ and a third relative refractive index percent change $\Delta_3\%$ relative to pure silica glass, wherein $\Delta_2\% > \Delta_3\%$ and $\Delta_3\%$ is less than about −1.0%.

20 Claims, 3 Drawing Sheets

BEND INSENSITIVE OPTICAL FIBERS

BACKGROUND OF THE INVENTION

1. Field of the Invention

The present invention relates generally to optical fibers, and particularly to bend insensitive optical fibers comprising a low index of refraction ring therein.

2. Technical Background

Glass optical fibers with improved bend loss properties have recently been of significant interest in the telecommunications field. Techniques for improving fiber bending properties can play important roles in many types of fibers, including transmission fibers used in long distance, single-mode and multimode fibers used in the emerging area of fiber to the home applications, and dispersion compensation fibers where bending loss has limited many designs from practical use. In certain applications such as fiber to the home applications, the ability to form a tight bending diameter of 20 mm or less is desired with negligible bending loss. Many of the proposed solutions for this problem involve significant modification of the fiber refractive index profile.

SUMMARY OF THE INVENTION

A single-mode optical fiber includes a core, an inner cladding and a low index ring. The core may include silica-based glass and exhibit an index of refraction $n_1$ and a relative refractive index percent $\Delta_1\%$ relative to pure silica glass and a radius $r_1$. The inner cladding surrounds and directly contacts the core and extends from $r_1$ to a radius $r_2$ such that the inner cladding has a radial thickness of $r_2-r_1$. The inner cladding may comprise silica-based glass and exhibit an index of refraction $n_2$ and a relative refractive index percent $\Delta_2\%$ relative to pure silica glass, wherein $n_1 > n_2$, $\Delta_1\% > \Delta_2\%$ and the difference between $\Delta_1\%$ and $\Delta_2\%$ ($\Delta_1\% - \Delta_2\%$) is greater than about 0.1%. The low index ring surrounds and directly contacts the inner cladding and extends from $r_2$ to a radius $r_3$ such that the low index ring has a radial thickness of $r_3-r_2$. The low index ring may comprise silica-based glass co-doped with boron and fluorine, a radial thickness of less than about 20 μm, a third index of refraction $n_3$ and a third relative refractive index percent $\Delta_3\%$ relative to pure silica glass, wherein $n_2 > n_3$, $\Delta_2\% > \Delta_3\%$ and $\Delta_3\%$ less than about $-1.0\%$. The fiber is single-moded at 1550 nm. More preferably, the fiber is single-moded at 1310 nm.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
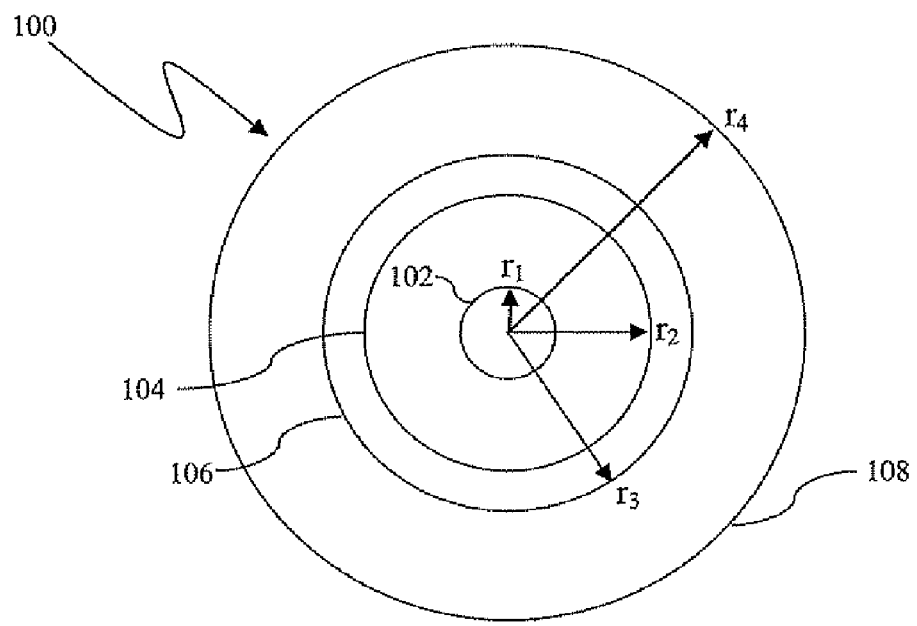
FIG. 1 is a cross sectional view of an optical fiber 100 comprising a core 102, an inner cladding 104, a low index ring 106 and an outer cladding 108 according to one or more embodiments shown and described herein.

Additional features and advantages of the invention will be set forth in the detailed description which follows and will be apparent to those skilled in the art from the description or recognized by practicing the invention as described in the following description together with the claims and appended drawings.

The "refractive index profile," as used herein, is the relationship between refractive index or relative refractive index and waveguide fiber radius.

"Relative refractive index percent," as used herein, is defined as:

$$\Delta_i\% = 100 \times \frac{(n_i^2 - n_{ref}^2)}{2n_i^2}$$

where $n_i$ is the maximum refractive index in region i, unless otherwise specified, and $n_{ref}$ is the refractive index of pure silica glass, unless otherwise specified. Accordingly, as used herein, the relative refractive index percent is relative to pure silica glass.

More specifically, as used herein, $\Delta_1\%$ refers to the relative refractive index percent of a core of the optical fiber, $\Delta_2\%$ refers to the relative refractive index percent of an inner cladding of the optical fiber and $\Delta_3\%$ refers to the relative refractive index percent of a low index ring of the optical fiber.

Mode field diameter (MFD) is a measure of the spot size or beam width of light propagating in a single-mode fiber. Mode-field diameter is function of the source wavelength, fiber core radius and fiber refractive index profile. MFD is measured using the Peterman II method where MFD=2 w, and $$w^2 = 2 \frac{\int_0^\infty E^2 r\, dr}{\int_0^\infty (dE/dr)^2} r\, dr$$

where E is the electric field distribution in the fiber and r is the radius of the fiber.

Chromatic dispersion or dispersion of a fiber is the sum of the material dispersion, the waveguide dispersion, and the inter-modal dispersion. In the case of single-mode waveguide fibers the inter-modal dispersion is zero.

Cutoff wavelength as used herein refers to the cabled cutoff wavelength, or "cabled cutoff" which is lower than the measured fiber cutoff due to higher levels of bending and mechanical pressure in the cable environment. The actual cabled condition is measured using the cabled cutoff test described in the EIA-445 Fiber Optic Test Procedures, which are part of the EIA-TIA Fiber Optics Standards, that is, the Electronics Industry Alliance-Telecommunications Industry Association Fiber Optics Standards, more commonly known as FOTP's.

Lambda zero, as used herein, refers to the wavelength of light at which chromatic dispersion is zero.

The bend resistance or bend performance of an optical fiber may be measured by the induced attenuation of light propagating through the fiber under prescribed test conditions. As used herein, the 10, 15, and 20 mm macrobend tests for measuring the bend performance of an optical fiber consist of wrapping the fiber 5 times around a 10, 15, and 20 mm mandrel, respectively, and calculating the induced attenuation (i.e. the increase in attenuation) per turn or per meter caused by wrapping the fiber around the mandrel.

Unless otherwise specified herein, measurements of the properties of the optical fiber are taken at 1550 nm.

FIG. 1 shows a cross section of an optical fiber according to one or more embodiments shown and described herein. The optical fibers described herein generally comprise a core, an inner cladding, a low index ring and an outer cladding. The structure and composition of the optical fibers as well as the properties of the optical fibers will be described and discussed in more detail herein.

Figure 2:
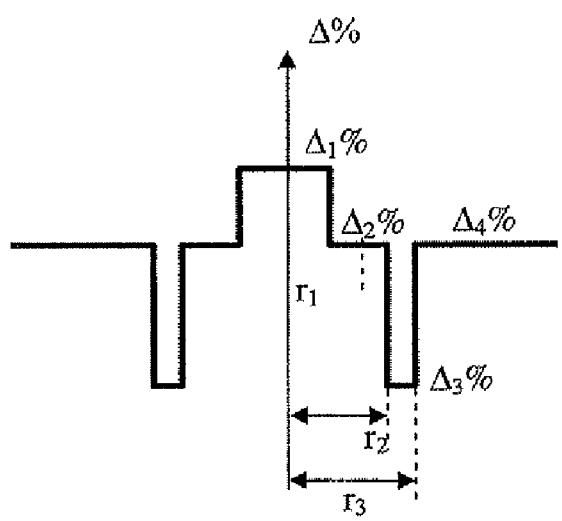
FIG. 2 generally depicts the refractive index profile of the optical fiber 100 of FIG. 1.

Referring to FIGS. 1 and 2, a cross section of an optical fiber 100 and the corresponding refractive index profile for the optical fiber 100 are shown according to one or more embodiments described herein. The optical fiber generally comprises a core 102, an inner cladding 104, a low index ring 106, and an outer cladding 108. In the embodiment shown, the core 102, the inner cladding 104 and the outer cladding 106 generally comprise silica, specifically silica glass. The cross section of the optical fiber 100 may be generally circular-symmetric with respect to the center of the core 102 and the core 102 may have a radius $r_1$. The inner cladding 104 may surround the core 102 and extend from the radius $r_1$ to the radius $r_2$ such that the inner cladding has a radial thickness $T_2=r_2-r_1$. The low index ring 106 may surround the inner cladding 104 and extend from the radius $r_2$ to the radius $r_3$ such that the low index ring has a radial thickness $T_3$. The outer cladding 108 may surround the low index ring 106 and extend from the radius $r_3$ to the radius $r_4$ such that the outer cladding has a radial thickness of $T_4=r_4-r_3$. Accordingly, the glass portion of the optical fiber 1100 (e.g., the core 102, the inner cladding 104, the low index ring 106, and the outer cladding 108) may have a diameter of $2r_4$. In the embodiments described herein, the diameter of the glass portion of the optical fiber is between 120 and 130 µm, preferably about 125 µm.

The core 102 may have an index of refraction $n_1$ and a corresponding relative refractive index percent $\Delta_1\%$ relative to pure silica glass, the inner cladding may have an index of refraction $n_2$ and a corresponding relative refractive index percent $\Delta_2\%$ relative to pure silica glass and the low index ring 106 may have an index of refraction $n_3$ and a corresponding relative refractive index percent $\Delta_3\%$ relative to pure silica glass such that $n_1>n_2>n_3$ and $\Delta_1\%>\Delta_2\%>\Delta_3\%$ which corresponds to the step refractive index profile generally shown in FIG. 2. The outer cladding 108 of the optical fiber 100 may comprise an index of refraction $n_4$ and a relative refractive index $\Delta_4\%$ which is generally greater than the relative refractive index $\Delta_3\%$ of the low index ring 106 (e.g., $\Delta_4\%>\Delta_3\%$) such that the low index ring 106 is a depressed index moat disposed between the inner cladding 104 and the outer cladding 108. In one embodiment, the relative refractive index $\Delta_4\%$ of the outer cladding 106 may be greater than the relative refractive index $\Delta_2\%$ of the inner cladding 104. In another embodiment, the relative refractive index $\Delta_4\%$ of the outer cladding 106 may be equal to the relative refractive index $\Delta_2\%$ of the inner cladding 104. In this embodiment, the composition of the outer cladding may be the same as the composition of the inner cladding 104. While FIG. 2 depicts a stepped refractive index profile, it should be understood that the refractive index profile may also be a gradient refractive index profile or a rounded step or other shape.

In the embodiment of the optical fiber 100 shown in FIG. 1, the radius $r_1$ of the core is from about 3 µm to about 5 µm, more preferably from about 3.5 µm to about 4.5 µm and, most preferably, from about 3.8 µm to about 4.3 µm.

In the embodiments shown and described herein, the core 102 may comprise pure silica glass ($SiO_2$) or, alternatively, the core 102 may comprise one or more index of refraction raising dopants such as, for example, $GeO_2$, $Al_2O_3$, $P_2O_5$, $TiO_2$, $ZrO_2$, $Nb_2O_5$ and/or $Ta_2O_5$, such as when the core 102 is "up-doped." For example, when the core is up-doped, the core 102 may contain from about 4.0 wt. % to about 20 wt. % $GeO_2$. For example, in one embodiment, the core 102 may comprise from about 4.0 wt. % to about 6.5 wt. % $GeO_2$, more preferably from about 5.0 wt. % to about 6.0 wt. % $GeO_2$, and, most preferably, from about 5.2 wt. % to about 5.5 wt. % $GeO_2$, which increases the index of refraction $n_1$ of the core 102. Accordingly, when the core 102 is up-doped with $GeO_2$ as described herein, $\Delta_1\%$ of the core 102 may be from about 0.2% to about 2%. The core 102 may be passive, e.g., the core 102 does not contain any active elements which would enable a gain or lasing action in the core 102. Thus, in some embodiments, the core preferably comprises less than 2 weight percent active rare-earth dopants, more preferably less than 1 weight percent active rare-earth dopants, and even more preferably the core is essentially free of active rare-earth dopants, and even more preferably the core does not comprise any active rare-earth dopants. Specifically, the core 102 may be devoid of any rare earth dopants including Yb, Fr, Pr, Nd, Tm, Sm and Tb.

As discussed above, the inner cladding 104 has a radial thickness generally defined by $r_2-r_1$. The radial thickness of the inner cladding 104 may generally be expressed in terms of a core/clad ratio defined as $r_1/r_2$ for the inner cladding. The inner cladding 104 of the optical fiber 100 generally has a core/clad ratio of about 0.2 to about 0.7, more preferably 0.3 to about 0.6 and most preferably 0.33 to about 0.45.

The inner cladding 104 may comprise pure silica glass ($SiO_2$), silica glass with one or more dopants which increase the index of refraction (e.g., $GeO_2$, $Al_2O_3$, $P_2O_5$, $TiO_2$, $ZrO_2$, $Nb_2O_5$ and/or $Ta_2O_5$), such as when the inner cladding 104 is "up-doped," or silica glass with a dopant which decreases the index of refraction, such as fluorine, such as when the inner cladding is "down-doped." For example, in one embodiment, the inner cladding is pure silica glass. In yet another embodiment, the inner cladding may comprise silica glass down-doped with fluorine from about 0.5 wt. % to about 3 wt. %, more preferably from about 1 wt % to about 2 wt. % fluorine.

In general, the composition of the inner cladding 104 and the composition of the core 102 may be such that the difference between $\Delta_1\%$ and $\Delta_2\%$ (e.g., $\Delta_1\%-\Delta_2\%$) may be greater than about 0.1%, more preferably greater than about 0.2% and, most preferably, from about 0.25% to about 1%.

The radial thickness (e.g., $r_3-r_2$) of the low index ring 106 is generally less than about 20 μm, preferably from about 1 μm to about 20 μm. However, the radial thickness of the low index ring 106 may be interrelated with the value of $\Delta_3\%$. More specifically, the low index ring 106 may have a volume profile $V_3$ such that:

$$V_3 = 2\int_{r_2}^{r_3} \Delta_3\%(r)\,dr,$$

which may be rewritten as:

$$V_3 = \Delta_3\%(r_3^2 - r_2^2).$$

For an optical fiber with a cable cutoff of less than about 1260 nm the volume index $V_3$ of the low index ring 106 is from about $-20\%\mu m^2$ to about $-65\%\mu m^2$, more preferably from about $-30\%\mu m^2$ to about $-60\%\mu m^2$, and, most preferably from about $-40\%\mu m^2$ to about $-60\%\mu m^2$. In other embodiments, the cable cutoff may be less than 1500 nm but greater than 1260 nm, wherein the volume index $V_3$ of the low index ring 106 is from about $-60\%\mu m^2$ to about $-120\%\mu m^2$.

The low index ring 106 comprises silica glass down-doped to lower the index of refraction $n_3$ of the low index ring 106 with respect to pure silica glass. In one embodiment, the low index ring 106 may comprise silica glass down-doped with boron. For example, the low index ring 106 may comprise silica glass down-doped with boron in the form of $B_2O_3$ in an amount from about 3 wt. % to about 20 wt. %, in some other embodiments from about 3.5 wt. % to about 15 wt. %, and, in some other embodiments, from about 4 wt. % to about 8 wt. %, such that the relative refractive index percent ($\Delta_3\%$) of the low index ring 106 is less than about $-0.1\%$, more preferably less than about $-0.5\%$ and most preferably less than about $-1\%$ relative to pure silica glass.

In another embodiment, the low index ring 106 may comprise silica glass down-doped with fluorine and boron. For example, the low index ring 106 may comprise from about 0.5 wt. % to about 5 wt. % F and from about 0.5 wt. % to about 20 wt. % B in the form of $B_2O_3$. In one embodiment, the low index ring 106 may comprise from about 3 wt. % to about 10 wt. % B and from about 0.5 wt. % to about 3 wt. % F, in some other embodiments from about 3.5 wt. % to about 8 wt. % B and from about 1 wt. % to about 3 wt. % F and, in some other embodiments, from about 4 wt. % to about 6 wt. % B and from about 2 wt. % to about 3 wt. % F such that the relative refractive index percent ($\Delta_3\%$) of the low index ring 106 relative to pure silica glass is less than about $-0.7\%$, more preferably less than about $-1.0\%$, even more preferably less than about $-1.5\%$ and, most preferably, about $-2.5\%$.

The outer cladding 108 may comprise pure silica glass or silica glass comprising a dopant which decreases the index of refraction of the silica glass such as boron or fluorine. As discussed above, in one embodiment, the outer cladding 108 may generally have the same composition as the inner cladding 104. For example, when the inner cladding 104 comprises pure silica glass, the outer cladding 108 may also comprise pure silica glass. Similarly, when the inner cladding 104 is down-doped with fluorine or another, similar index-decreasing dopant, the outer cladding may be down-doped with the same dopant in substantially the same amount. However, it should be understood that the outer cladding 108 may have a different composition than the inner cladding 104. The outer cladding 108 may generally comprise a radial thickness $T_4$ such that the outer diameter ($2r_4$) is at least 125 μm.

In one embodiment, the core 102, inner cladding 104 and low index ring 106 of the optical fiber 100 may be formed by an outside-vapor-deposition (OVD) process. The OVD process is a way of making optical fiber through reactions from the desired vapor ingredients (including silica and the other desired dopant precursors) via a hydrolysis process in a $CH_4 + O_2$ flame to form soot-particles, which are then collected by thermophoretic means onto either a bait rod (for making a core soot-preform) or a glass core cane or rod (for making overclad soot-preform). The soot-preform is subsequently dried and densified into solid transparent glass in a high temperature furnace (after the bait rod is removed from the core preform), a process commonly referred to as consolidation. The desired core and cladding compositions are achieved by utilizing different amounts of various vapor-phase ingredients for each of the layers in the soot preform fabrication process. For example, the core/cladding perform may be generated first, then consolidated, and the final (consolidated) preform drawn into the optical fiber 100 by known fiber-drawing methods.

More specifically, vapor-precursor-materials that may be used to make the portion of the soot preform associated with the fiber core are, for example, $SiCl_4$, $GeCl_4$, $AlCl_3$, $TiCl_4$, or $POCl_3$. As described herein, the core may comprise $GeO_2$ doped silica glass. After the up-doped $SiO_2$ soot is consolidated into the core preform, soot of pure $SiO_2$ may be deposited on the core preform to form a soot preform of the inner cladding portion of the optical fiber and thereafter consolidated. The soot preform of the inner cladding portion may be consolidated in the presence of a gas containing F, such as $SiF_4$, such that, after consolidation, the inner cladding portion is down-doped with a desired amount of fluorine.

After the core/cladding preform is formed, $SiO_2$ down doped with $B_2O_3$ is deposited on the consolidated core/cladding preform to form a soot preform of the low index ring portion. In one embodiment, the soot preform of the low index ring portion may be consolidated under conditions suitable for forming a low index ring portion of the preform comprising silica glass doped with only boron after consolidation.

In another embodiment, when a low index ring comprising boron and fluorine is desired, a gas containing F, for example $SiF_4$ and/or $BF_3$, is used in the consolidation process to lower the refractive index of the low index ring portion of the preform. The soot preform according to this embodiment may be consolidated in a furnace with an F containing compound, for example with $SiF_4$, $CF_4$ or $BF_3$. Fluorine (F) sinter-doping into the boron-containing soot-preform, according to an embodiment of this invention, is a single-zone consolidation process. The entire consolidation process occurs in the lower temperature furnace's drying zone region, which is usually situated in the upper part of the standard consolidation furnace. Consolidation is done at relatively low temperatures due to the rather low glass-transition temperature ($T_g$) of the B/F co-doped silica (which is around 800° C. or lower). The exemplary silica soot preform (doped with B) may be first $Cl_2$-dried at around 850° C.-900° C. for 45-60 minutes. The dry-zone temperature is then ramped-up to 1200° C. for sinter/F doping for 90 to 150 minutes with $SiF_4$. During sintering and F doping, the boron composition in the consolidated glass drops significantly. For example, for about 10 wt % boron in the soot phase, about 4-8 wt % boron remains in the fully consolidated glass phase. Such a reduction is caused by etch out of boron in the presence of fluorine. As a result, the boron and fluorine concentration in glass may be in the range of 4-8 wt % and 1.5-2.5 wt %, respectively. After the consolidation process, the consolidated preform is cooled down and taken to fiber draw.

While specific reference is made herein to various embodiments for forming an optical fiber 100 having a boron doped or boron and fluorine co-doped low index ring, it should be understood that other processing techniques may be utilized to form the boron doped or boron and fluorine co-doped low index ring.

Referring to the refractive index profile of the optical fiber 100 generally illustrated in FIG. 2, the relative refractive indices of the various portions of the optical fiber (e.g., the core 102, the inner cladding 104, the low index ring 106 and the outer cladding 108) may be such that $\Delta_1\% > \Delta_2\% > \Delta_3\%$ while $\Delta_4\% > \Delta_3\%$. While the refractive index profile of the optical fiber 100 shown in FIG. 2 is generally shown as a step-profile, it should be understood that the composition of various portions of the optical fiber 100 may be adjusted in the radial direction such that the refractive index profile is a gradient profile, rounded step or some other shape, e.g. a combination of a step profile with a gradient profile. Variations of this refractive index profile of FIG. 2 with respect to the refractive index of pure silica glass (e.g. $n_{Si}$) will now be discussed with specific reference to FIGS. 3-6.

Referring now to FIGS. 3-6, several refractive index profiles are shown for optical fibers having low index rings. In one embodiment, depicted in FIG. 3, the core 102 of the optical fiber is up-doped with $GeO_2$ such that the index of refraction of the core is increased relative to pure silica glass ($n_{Si}$) and, as such, the core 102 has a positive relative refractive index $\Delta_1\%$. In this embodiment, the inner cladding 104 comprises pure silica glass and, accordingly, $\Delta_2\%$ is zero. The low index ring 106 in this embodiment is down-doped with boron such that the index of refraction $n_3$ of the low index ring 106 is depressed (e.g., $\Delta_3\%$ is negative). In this embodiment, down-doping the low index ring 106 with boron creates a shallow low index ring 106. Accordingly, the width of the low index ring 106 (e.g., $r_3-r_2$) must be increased to maintain the volume profile $V_3$ of the low index ring 106 in the desired range. The outer cladding comprises pure silica glass and, accordingly, $\Delta_4\%$ is approximately zero.

Figure 3:
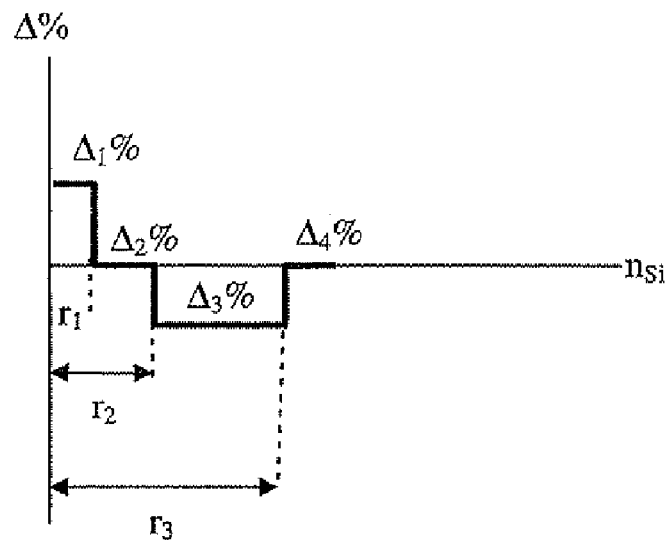
FIG. 3 depicts a refractive index profile for an optical fiber 100 comprising a low index ring 106 according to one or more embodiments shown and described herein.
Figure 4:
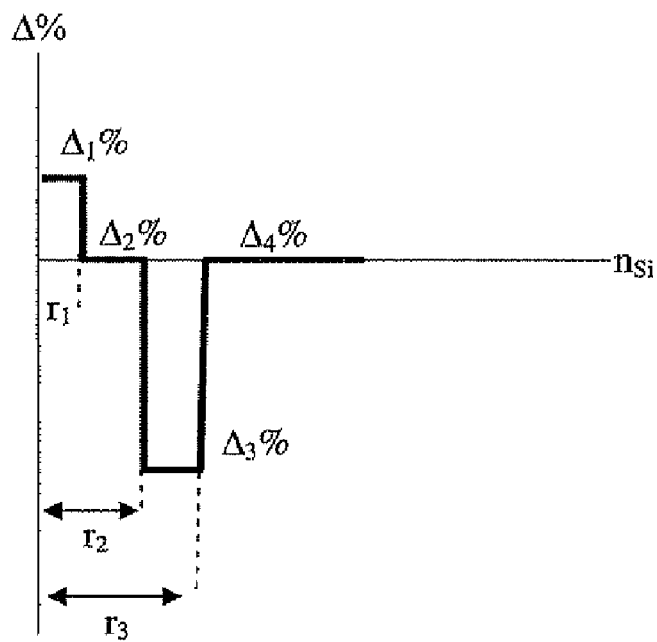
FIG. 4 depicts a refractive index profile for an optical fiber 100 comprising a low index ring 106 according to one or more embodiments shown and described herein.

In another embodiment depicted in FIG. 4, the core 102 and the inner cladding 104 have substantially the same refractive index properties relative to pure silica glass as described with respect to FIG. 3. However, in this embodiment, the low index ring 106 is co-doped with boron and fluorine which greatly decrease the index of refraction $n_3$ of the low index ring 106 compared to the low index ring down-doped with boron alone. As such, the relative refractive index $\Delta_3\%$ of the inner cladding is greatly depressed relative to silica glass. Accordingly, for a given volume profile $V_3$, the width (e.g., $r_3-r_2$) of a B/F co-doped low index ring 106 may be much narrower than a low index ring 106 comprising only boron. The outer cladding 108 comprise pure silica glass such that $\Delta_4\%$ is approximately zero.

Figure 5:
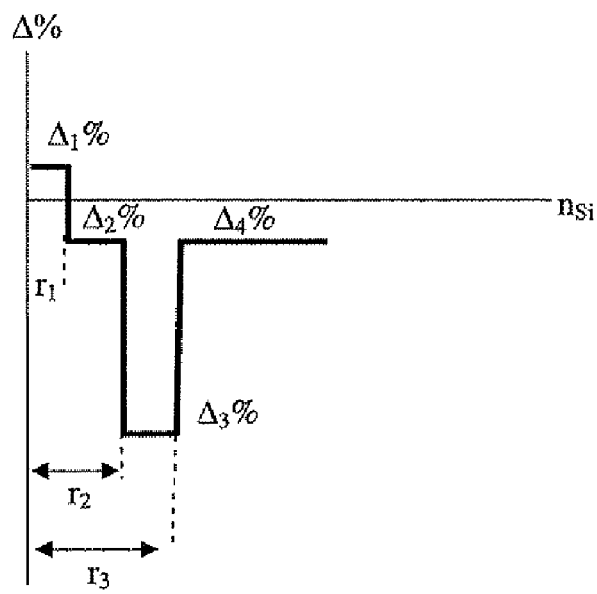
FIG. 5 depicts a refractive index profile for an optical fiber 100 comprising a low index ring 106 according to one or more embodiments shown and described herein.

FIG. 5 shows the refractive index profile of an optical fiber 100 where the core 102 is up-doped with $GeO_2$ as described in FIGS. 3 and 4. However, the inner cladding 104 is down-doped with fluorine such that $\Delta_2\%$ is negative. The low index ring 106 is down-doped with a combination of boron and fluorine such that $\Delta_3\% < \Delta_2\%$. The outer cladding 108 may also comprise fluorine such that the outer cladding 108 is down doped relative to pure silica glass and $\Delta_4\%$ is negative.

Figure 6:
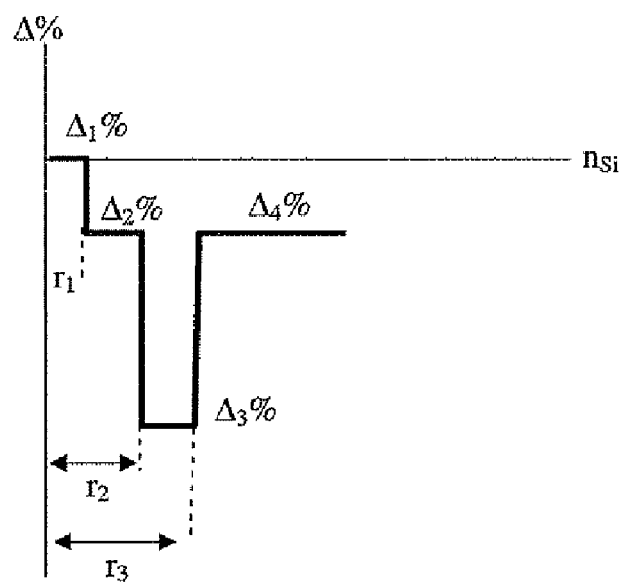
FIG. 6 depicts a refractive index profile for an optical fiber 100 comprising a low index ring 106 according to one or more embodiments shown and described herein.

FIG. 6 shows the refractive index profile of an optical fiber 100 where the core 102 comprises pure silica glass such that $\Delta_1\%$ is approximately zero. By pure silica, we mean that the core region does not contain any materials in an amount which significantly impacts the refractive index of the core. However, small amounts of dopants (e.g., chlorine and/or fluorine in an amount less than 1500 ppm of each) can be employed within the core which is otherwise pure silica. Preferably in embodiments which employ a "silica" core, the core is substantially free of germania, and more preferably the core is germania free. The inner cladding 104 comprises fluorine such that the inner cladding is down doped with respect to $n_{Si}$ and $\Delta_2\%$ is negative. The low index ring 106 is co-doped with boron and fluorine such that the low index ring 106 is down doped with respect to pure silica glass and $\Delta_3\% < \Delta_2\%$. The outer cladding 108 may contain fluorine such that the outer cladding 398 is down doped relative to pure silica glass and $\Delta_4\%$ is negative. Fibers having refractive index profile shown in FIG. 6 have generally lower attenuation due to the lower scattering coefficient of the pure silica core.

The various embodiments of the optical fiber 100 with a low index ring 106 shown in FIGS. 3-6 may have a macrobend loss at 1550 nm of less than about 1.0 dB/turn for a 10 mm bend diameter, a loss of less than about 0.5 dB/turn for a 15 mm bend diameter, and a loss of less than about 0.2 dB/turn for a 20 mm bend diameter. Various design examples of optical fibers comprising low index rings are shown below in Table 1.

Table 1 shows eight modeled design examples of optical fibers comprising low index rings and their related optical properties. In each design example the optical fibers have an inner cladding with a core/clad ratio in the range of 0.2 to about 0.7 while the volume profile $V_3$ of the low index ring is generally in the range from about −20 to about −60%μm², more preferably in the range from about −30 to about −60%μm², even more preferably in the range from about −40 to about −60%μm², and most preferably in the range from about −50 to about −60%μm². The bending loss of each design example will be less than 1 dB/turn for a bend radius of 5 mm at a wavelength of 1550 nm. Further, the optical properties of the examples in Table 1 will be compatible with ITU-T G.652 standards. Specifically, the optical fibers exhibit a cable cutoff wavelength of less than 1260 nm, zero dispersion at wavelengths between 1100 nm and 1324 nm, mode field diameters between 8.20 μm and 9.50 μm at 1100 nm, and a 10 mm diameter mandrel bend loss of less than 1.0 dB/turn.

TABLE 1

DESIGN EXAMPLES

| | Example | | | | | | | |
|---|---|---|---|---|---|---|---|---|
| | 1 | 2 | 3 | 4 | 5 | 6 | 7 | 8 |
| Core dopant | $GeO_2$ | $GeO_2$ | $GeO_2$ | $GeO_2$ | $GeO_2$ | none | $GeO_2$ | none |
| $\Delta_1\%$ | 0.34 | 0.34 | 0.325 | 0.34 | 0.125 | 0 | 0.325 | 0 |
| Inner Cladding dopant | none | none | none | none | F | F | none | F |
| $\Delta_2\%$ | 0 | 0 | 0 | 0 | −0.2 | −0.34 | 0 | −0.33 |
| Ring dopant | B | B | B | B, F | B, F | B, F | B, F | B, F |
| $\Delta_3\%$ | −0.1 | −0.2 | −0.35 | −2 | −1.8 | −1.68 | −1 | −0.67 |
| $r_1$ (μm) | 3.9 | 3.9 | 3.9 | 4 | 3.9 | 3.9 | 4 | 4 |
| $r_2$ (μm) | 6.5 | 7.8 | 8.5 | 11 | 11 | 11 | 10.4 | 10 |
| $r_3$ (μm) | 24.0 | 18 | 14.5 | 12.2 | 12.4 | 12.5 | 12.8 | 13.5 |
| Core/Clad Ratio ($r_1/r_2$) | 0.6 | 0.5 | 0.46 | 0.36 | 0.35 | 0.35 | 0.38 | 0.4 |
| Low index ring width ($r_3 - r_2$) (μm) | 17.5 | 10.2 | 6 | 1.2 | 1.4 | 1.5 | 2.4 | 3.5 |
| Vol. Profile $V_3$ (% μm$^2$) | −53.4 | −52.6 | −48.3 | −55.7 | −59.0 | −59.0 | −55.7 | −55.1 |
| Cable cutoff wavelength (nm) | <1260 | <1260 | <1260 | <1260 | <1260 | <1260 | <1260 | <1260 |
| MFD at 1310 nm (μm) | 8.6 | 8.6 | 8.8 | 9.0 | 9.0 | 9.0 | 8.9 | 8.9 |
| Lambda zero (nm) | 1312.5 | 1311.3 | 1310.2 | 1316.1 | 1315.9 | 1316.5 | 1314.2 | 1313.4 |
| Slope (ps/nm$^2$/km) | 0.0878 | 0.0900 | 0.0916 | 0.0906 | 0.0907 | 0.0906 | 0.0910 | 0.0908 |
| MFD at 1550 nm (μm) | 9.7 | 9.7 | 9.9 | 9.8 | 10.2 | 10.2 | 10.1 | 10.0 |

The optical fiber in examples 1-3 comprise a core 104 up-doped with $GeO_2$ such that $\Delta_1\%$ was 0.325 to 0.34%. The inner cladding comprise pure silica glass such that $\Delta_2\%$ was 0%. In all three examples, the low index ring is down doped with boron. The amount of boron in each example is varied such that $\Delta_3\%$ in examples 1, 2 and 3 is −0.1%, −0.2% and −0.35%, respectively. Accordingly, example 1 has the shallowest low index ring and example 3 has the deepest low index ring. The width of the low index ring is sized according to $\Delta_3\%$ to maintain the volume index profile. The optical fibers with boron down-doped low index rings generally has a cable cutoff wavelength of less than less than 1260 nm. Accordingly, the optical fibers in these examples are single-moded at 1310 nm. The optical fibers exhibit a mode field diameter at 1310 nm from 8.6 μm to 8.8 μm; a mode field diameter at 1550 nm from about 9.7 μm to about 9.9 μm; and zero dispersion at about 1310 nm.

In design examples 4-8 the core 102 and the cladding 104 are formed such that the difference between $\Delta_1\%$ and $\Delta_2\%$ is about 0.30% or greater. In the five examples, the low index ring is co-doped with boron and fluorine. The amount of boron and fluorine in each example is varied such that $\Delta_3\%$ in examples 4, 5, 6, 7, and 8 is −2%, −1.8%, −1.675%, −1% and −0.67%, respectively. Accordingly, the low index ring in example 4 has the greatest depth while the low index ring of example 8 has the shallowest depth. The optical fibers with boron-fluorine co-doped low index rings generally have a cable cutoff wavelength of less than 1260 nm. Accordingly, the optical fibers in these examples are single-moded at 1310 nm. The optical fibers exhibit mode field diameters at 1310 nm from 8.9 μm to 9.0 μm; mode field diameters at 1310 nm from about 8.9 μm to about 9.0 μm; and zero dispersion from about 1313 nm to about 1316 nm.

Table 2 contains measured data for two exemplary optical fibers drawn from an optical fiber preform and having the fiber structure depicted in FIG. 2. Example 9 generally comprised a step index $GeO_2$ doped silica core (+0.34% delta vs. silica, 4.5 micron radius), directly surrounded by a silica inner cladding (having an index of about 0% delta, and an outer radius of about 12 microns), directly surrounded by a low index ring comprising about 4 weight % $B_2O_3$ and 2 weight % fluorine (having a minimum index of about −0.7% delta, and an outer radius of about 16.5 microns and a moat volume of about −52.5% microns$^2$), directly surrounded by a silica outer cladding (having an index of about 0% delta, and an outer radius of 62.5 microns. Example 10 generally comprised a step index $GeO_2$ doped silica core (+0.33% delta vs. silica, 5 micron radius), directly surrounded by a silica inner cladding (having an index of about 0% delta, and an outer radius of about 14 microns), directly surrounded by a low index ring comprising about 4.5 weight % $B_2O_3$ and about 1.9 weight % fluorine (having a minimum index of about −0.76% delta, and an outer radius of about 17 microns and a moat volume of about −43.3% microns$^2$), directly surrounded by a silica outer cladding (having an index of about 0% delta, and an outer radius of 62.5 microns.

Fiber example 9 exhibited measured bend losses of 0.13 dB/turn, 0.18 dB/turn and 0.42 dB/turn for bend radii of 20 mm, 15 mm and 10 mm, respectively, measured at 1550 nm. The measured MFD of fiber example 9 was 9.05 μm and 10.34 μm at 1310 nm and 1550 nm, respectively. The cable cutoff was determined to be 1160 nm. The measured attenuation of fiber example 9 was determined to be 0.470 dB/km at 1310 nm and 0.404 dB/km at 1550 nm.

Fiber example 10 exhibited measured bend losses of 0.05 dB/turn, 0.15 dB/turn and 0.90 dB/turn for bend radii of 20 mm, 15 mm and 10 mm, respectively, when measured at 1550 nm. The measured MFDs of fiber example 10 were 9.31 μm and 10.27 μm at 1310 nm and 1550 nm, respectively. The cable cutoff was determined to be 1100 nm. The measured attenuation of fiber example 10 was 0.257 dB/km at 1550 nm.

TABLE 2

| | Attenuation (dB/km) | | Cable cutoff | MFD (μm) | | Macrobend Loss at 1550 nm (dB/turn) | | |
|---|---|---|---|---|---|---|---|---|
| Example | 1310 nm | 1550 nm | (nm) | 1310 nm | 1550 nm | 10 mm dia. | 15 mm dia. | 20 mm dia. |
| 9 | 0.470 | 0.404 | 1160 | 9.05 | 10.34 | 0.42 | 0.18 | 0.13 |
| 10 | NA | 0.257 | 1100 | 9.31 | 10.27 | 0.90 | 0.15 | 0.05 |

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A optical fiber which is single-mode at 1550 nm comprising a core, an inner cladding and a low index ring, wherein:
   the core comprises silica-based glass, an index of refraction $n_1$, a relative refractive index percent $\Delta_1\%$ relative to pure silica glass, a radius;
   the inner cladding surrounds the core and extends from $r_1$ to a radius $r_2$ such that the inner cladding has a radial thickness of $r_2-r_1$, wherein the inner cladding comprises silica-based glass, an index of refraction $n_2$, a relative refractive index percent $\Delta_2\%$ relative to pure silica glass, wherein $n_1>n_2$, $\Delta_1\%>\Delta_2\%$ and the difference between $\Delta_1\%$ and $\Delta_2\%$ ($\Delta_1\%-\Delta_2\%$) is greater than about 0.1%; and
   the low index ring surrounds and directly contacts the inner cladding and extends from $r_2$ to a radius $r_3$ such that the low index ring has a radial thickness of $r_3-r_2<20$ μm, wherein the low index ring comprises silica-based glass co-doped with boron and fluorine, a third index of refraction $n_3$ and a third relative refractive index percent $\Delta_3\%$ relative to pure silica glass, wherein $n_2>n_3$, $\Delta_2\%>\Delta_3\%$ and $\Delta_3\%$ is less than about −0.7%; and
   the single-mode optical fiber having a cable cutoff wavelength of less than 1500 nm.

2. The optical fiber of claim 1 wherein $r_1$ is less than about 5 μm.

3. The optical fiber of claim 1 wherein the low index ring comprises a volume profile of between about −20% μm² and about −120% μm².

4. The optical fiber of claim 1 wherein the inner cladding has a core/cladding ratio of $r_1/r_2$ from about 0.2 to about 0.7.

5. The optical fiber of claim 1 wherein the optical fiber comprises:
   a cable cutoff wavelength of less than 1260 nm;
   a zero dispersion at wavelengths between 1100 nm and 1324 nm;
   a mode field diameter between 8.20 μm and 9.50 μm at 1100 nm; and
   a 10 mm diameter mandrel bend loss of less than 1.0 dB/turn.

6. The optical fiber of claim 1, wherein the low index ring comprises from about 0.5 wt. % to about 20 wt. % boron in the form of $B_2O_3$ and from about 0.5 wt. % to about 5 wt. % F.

7. The optical fiber of claim 6, wherein the inner cladding comprises silica glass doped with fluorine and the core comprises silica glass doped with $GeO_2$.

8. The optical fiber of claim 7 wherein the amount of fluorine in the inner cladding is from about 0.5 wt. % to about 3 wt. % fluorine and the core comprises from about 4 wt. % to about 6.5 wt. % $GeO_2$.

9. The optical fiber of claim 7, wherein the inner cladding comprises silica glass doped with fluorine and the core comprises pure silica glass.

10. The optical fiber of claim 7 wherein the inner cladding comprises from about 0.5 wt. % to about 3 wt. % fluorine.

11. The optical fiber of claim 6, wherein the inner cladding comprises pure silica glass and the core comprises silica glass doped with $GeO_2$.

12. The optical fiber of claim 11 wherein the inner cladding comprises from about 4 wt. % to about 6.5 wt. % $GeO_2$.

13. The optical fiber of claim 1 further comprising an outer cladding surrounding the low index ring and extending from $r_3$ to a radius $r_4$ such that the outer cladding has a radial thickness of $r_4-r_3$, wherein the outer cladding comprises silica-based glass, an index of refraction $n_4$ and a relative refractive index percent $\Delta_4\%$ relative to pure silica glass, wherein $\Delta_4\%>\Delta_3\%$ and $2r_4$ is at least 125 μm.

14. The optical fiber of claim 13 wherein the outer cladding comprises pure silica glass.

15. The optical fiber of claim 13 wherein the outer cladding comprises fluorine.

16. The optical fiber of claim 15 wherein the outer cladding comprises from about 0.5 wt. % to about 3 wt. % fluorine.

17. The optical fiber of claim 13 wherein the relative refractive index percent $\Delta_4\%$ of the outer cladding is the same as the relative refractive index percent $\Delta_2\%$ of the inner cladding.

18. The optical fiber of claim 1 wherein the macrobend loss of the optical fiber at a wavelength of 1550 nm is less than about 0.1 dB/turn for a bending diameter of 10 mm.

19. The optical fiber of claim 1, wherein the macrobend loss of the optical fiber at a wavelength of 1550 nm is less than about 0.5 dB/turn for a bending diameter of 15 mm.

20. The optical fiber of claim 1, wherein the macrobend loss of the optical fiber at a wavelength of 1550 nm is less than about 0.2 dB/turn for a bending diameter of 20 mm.

* * * * *